United States Patent [19]

Strom

[11] Patent Number: 5,660,293
[45] Date of Patent: Aug. 26, 1997

[54] PRESSURE PLUG APPARATUS WITH SAFETY RETAINER UNIT

[75] Inventor: Roger A. Strom, Waterford, Wis.

[73] Assignee: Insilc Corporation, Doublin, Ohio

[21] Appl. No.: 734,176

[22] Filed: Oct. 21, 1996

Related U.S. Application Data

[63] Continuation of Ser. No. 349,319, Dec. 5, 1994, abandoned.

[51] Int. Cl.⁶ .......................... B65D 53/00; B65D 55/16; F16L 55/10
[52] U.S. Cl. .................. 220/236; 220/375; 138/90
[58] Field of Search ................... 220/88.1, 89.1, 220/236, 375; 138/90, 89; 215/212, 216, 306, 361, 358

[56] References Cited

U.S. PATENT DOCUMENTS

| | | | |
|---|---|---|---|
| 196,867 | 11/1877 | Besnard | 215/361 |
| 508,609 | 11/1893 | Ford . | |
| 986,297 | 3/1911 | Kinkade . | |
| 1,185,542 | 5/1916 | Roberts | 215/361 |
| 1,226,023 | 5/1917 | Smith . | |
| 1,557,966 | 10/1925 | Benshadle . | |
| 2,079,049 | 5/1937 | St. Clair | 215/358 X |
| 2,238,257 | 4/1941 | Fischer . | |
| 2,375,995 | 5/1945 | Kaeser | 220/236 |
| 2,493,452 | 1/1950 | Grigg | 138/90 X |
| 3,317,071 | 5/1967 | Teeter | 215/361 X |
| 3,812,810 | 5/1974 | Moeller . | |
| 4,385,643 | 5/1983 | Noe | 138/90 |
| 4,817,450 | 4/1989 | Jachim | 220/375 X |
| 5,000,236 | 3/1991 | Jemison | 215/306 X |
| 5,469,890 | 11/1995 | Carpentier | 138/89 |

FOREIGN PATENT DOCUMENTS

| | | |
|---|---|---|
| 1180936 | 6/1959 | France . |
| 1255289 | 1/1961 | France . |
| 470605 | 4/1952 | Italy . |

Primary Examiner—Allan N. Shoap
Assistant Examiner—Robin A. Hylton
Attorney, Agent, or Firm—Andrus, Sceales, Starke & Sawall

[57] ABSTRACT

A vessel pressure testing apparatus includes a safety retainer unit. An expanding plug unit is secured within a tubular outlet pipe of the vessel with a clamping bolt extending outwardly from an expanding rubber plug member. An attachment plate is secured abutting the outlet pipe with the clamping nut bearing on and locking the plate to the pipe and plug unit. A locking plate has a central opening larger than the external diameter of the pipe, and is passed over the pipe. A loop connector has one loop passed through an opening in the attachment plate and a second loop passed through a similar opening in the locking plate. The locking plate is located with the inner end spaced axially inwardly on the pipe relative to the outer end which is connected to the locking plate. Pressure is then applied to the vessel, and if the test plug fails for any reason, the plug unit tends to move from the pipe end. The plug unit cannot be propelled from the pipe, as the propelling force tends to pivot and increase the angular engagement of the connected locking plate with the pipe.

9 Claims, 4 Drawing Sheets

PRESSURE PLUG APPARATUS WITH SAFETY RETAINER UNIT

This application is a continuation of Ser. No. 08/349,319, filed Dec. 5, 1994, now abandoned.

BACKGROUND OF THE INVENTION

This invention relates to a pressure plug apparatus having a safety retainer unit to prevent dangerous propelling of the plug unit in the event of failure of the plug unit and particularly a pressure test plug unit.

Various piping and vessel systems require pressure testing in the initial fabrication as well as during the operative life of the product. Internal combustion engines require a radiator for air cooling of the liquid solution of the engine cooling system. The radiators present a typical pressure vessel which is periodically pressure tested. The present invention has been particularly applied to testing of large radiators of internal combustion engines connected to drive electrical generators, and will be described in connection therewith. However, the invention can be equally applied to any pressurized system through which carries a high pressure medium and which includes a projecting tubular member. In pressure testing systems, there is always a danger that the test plug unit may be blown from the tubular member, and a safety connector unit often is required.

Typical prior art testing assemblies including a safety connector between the releasable plug and the product are shown in U.S. Pat. Nos. 508,609 issued Nov. 14, 1893; 1,226,023 issued May 15, 1917; 1,557,966 issued Oct. 20, 1925; and 2,238,257 issued Apr. 15, 1941. The very early '609 patent discloses a pipe member, one end of which is releasably sealed by an expansion plug, in which a threaded bolt unit is adapted to apply a collapsing force to the rubber member; expanding the rubber member into sealing engagement with the pipe. The pipe end has an outer fixed retainer with outwardly projecting ear members. A cable is wrapped about the ears and the exterior of the clamping bolt unit to positively hold the expansion plug to the pipe. Test pressure is applied through the threaded coupling pipe to pressurize the pipe with the rope band positively preventing blowing of the plug from the pipe under test conditions.

U.S. Pat. Nos. '966 and '257 show somewhat similar systems, each having a sealing plug member with means for expanding of the plug member within the pipe. A yoke member is telescoped over the plug member and pipe end, with interengaging wall structures which prevent the plug member from moving outwardly of the yoke. Generally, a plurality of arm members project from the yoke outwardly and axially over the pipe end, which has suitable enlargements. Locking of the safety device to the pipe and through the yoke to the plug member prevents projection of the plug member under high pressure conditions.

U.S. Pat. No. 986,297 discloses a similar expanding plug unit with a safety mechanism including a yoke secured to the expanding plug structure and arms which project down over the pipe end, with set screws threaded through the extended arms into locking engagement with the pipe end.

U.S. Pat. No. 1,226,023 discloses a system in which an expanding plug is located set inwardly of the pipe end. A separate locking mechanism is secured overlapping the outer end of the projecting pipe, with an inner toothed arm and an outer screw member for rigidly clamping of the assembly into engagement with the pipe. The inner end of the tooth member may indirectly engage a portion of the plug to releasably lock it in place. Alternatively, where the pipe has an enlarged diameter end, separate arm members, pivotally secured to the safety unit, are pivoted inwardly into engagement with the structure of the test plug.

All such safety devices generally use a plurality of different parts, often requiring an enlargement on the pipe end or merely relying on the pressure of set screws to hold the safety device in place.

Also, the prior art does not generally lock the safety unit to the plug unit. Although expanding stoppers for marine application, generally known as bailer plugs, are often provided with an interconnection such as a chain and a screw member, for attaching of the unit to the boat transom adjacent a bailer opening. The expanding plug is located within the bailer opening, and removed for releasing water from within the boat. The chain structure allows the user to temporarily open the bailer opening while maintaining of the plug attached to the boat for convenient replacement. Such a system is not particularly adapted to the pressure testing of vessels and fixed pipe members, where the test plug is only to be temporarily applied to the unit and then removed for use elsewhere.

Although various test plug systems are available and have been suggested over a period of approximately 80 years, the prior art has certain disadvantages from the standpoint of complexity, with initial cost as well as relatively time consuming application requiring special pipe ends and the like. The inventor recognized there is a need for a test assembly in which a safety latch unit which can be readily coupled to a tubular test plug unit and which test assembly can be readily applied to a tubular structure of the pressure vessel without requiring a special end construction, or relying on any great skill with respect to the proper attachment of the assembly in place, such as may be required with the prior art systems, including set screws, cables and the like.

SUMMARY OF THE PRESENT INVENTION

The present invention is particularly directed to a safety retainer unit for seal unit and particularly a pressure test plug unit, which can be fixedly or removably attached to a seal unit by a simple direct coupling member for interconnection of the seal unit to a tubular connector of a vessel such as our inlet or outlet pipe, generally referred to herein as a tubular member. Generally, in accordance with this invention, the safety retainer unit or assembly includes a first member connected to form a part of the seal unit in the seal and test position and an aperture locking member coupled to the first member through a suitable coupling member or unit and releasable telescoped to the tubular member. The locking member has an opening somewhat larger than the tubular member of the vessel. The locking member is dropped over the tubular member with the coupler holding the outermost end of the locking member in relatively close spaced relation to the first member of the plug unit. The inner end of the locking member extends inwardly over the tubular member, such that any force tending to pull the outermost end outwardly binds the locking member onto the tubular member and positively prevent movement along the tubular member, with the interlocking pressure increasing with the increased force applied to the outer end of the locking member.

More particularly, a preferred construction has been applied to a radiator testing unit having a connecting pipe such as an inlet or outlet. The safety retainer unit was applied to an expanding plug unit of a conventional construction having an outer wing nut member threaded onto a clamping bolt extending outwardly from an expanding rubber plug member. A clamping plate is secured to the test plug unit with the clamping nut bearing on the outer end of the connector in the test position and locking of the clamping plate to the plug unit. The locking member is a plate-like member having a central opening generally related to the external diameter of the pipe, and with the opening somewhat larger than such pipe. The outer end of the clamping plate and the locking plate have similar aligned projections extended outwardly from the pipe.

The coupler is a rigid loop connector in the form of an 8-shaped high strength metal coupling clip, having one loop passed through an opening in the clamping plate and a second loop passed through a similar opening in the locking plate. The coupling clip allows pivotal movement of the plates relative to each other. Thus, in assembly, the locking plate is passed over the pipe, simultaneously with the insertion of the plug unit into the pipe, with the clamping plate abutting the end of the pipe. The plug expansion nut or other mechanism actuates the plug unit to expand the rubber ring into effective sealing engagement within the pipe end and with the clamping plate locked to the plug unit. The locking plate is extended over the pipe, and with the inner end spaced axially inwardly on the pipe relative to the outer coupled end of the locking plate. Pressure is then applied to the vessel generally through a second opening to the vessel or applied through an opening in the plug unit in accordance with known construction. If the holding force of plug unit fails for any reason, the plug unit can move from the pipe end but cannot be projected or propelled from the pipe because of the connection to the angled locking plate. Thus, any propelling force will be applied through the coupler to the outer end of the plate, tending to cause it to move outwardly and thereby increasing the angular engagement with the pipe. Any increase in such angular engagement further locks the locking plate to the pipe and prevents movement thereon, in accordance with mechanical construction.

Although the locking or retainer unit is readily formed of metal components, the components can be formed of any high strength material, which will withstand the pressure forces within the specifications for the test plug unit and the safety retainer unit.

The retainer and locking unit of the present invention provides a relatively simple but highly effective safety retaining system. The locking or retaining system is readily formed with known technology at a low cost, and thereby provides a cost effective safety retainer.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figure 1:
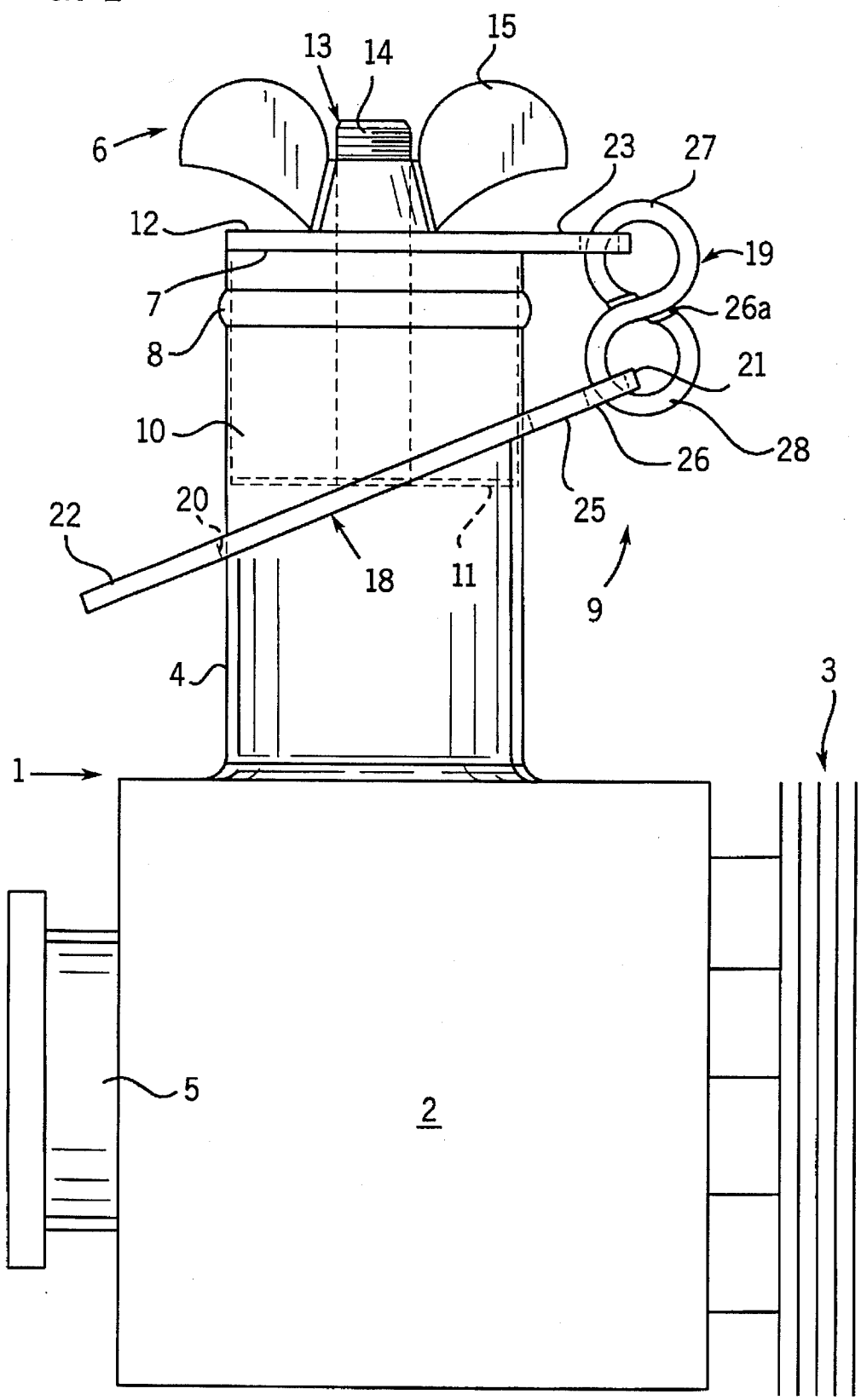
FIG. 1 is a side elevational view of a diagrammatically illustrated radiator application with a test plug assembly incorporating a safety retainer unit illustrating a preferred embodiment in accordance with the present invention.
Figure 2:
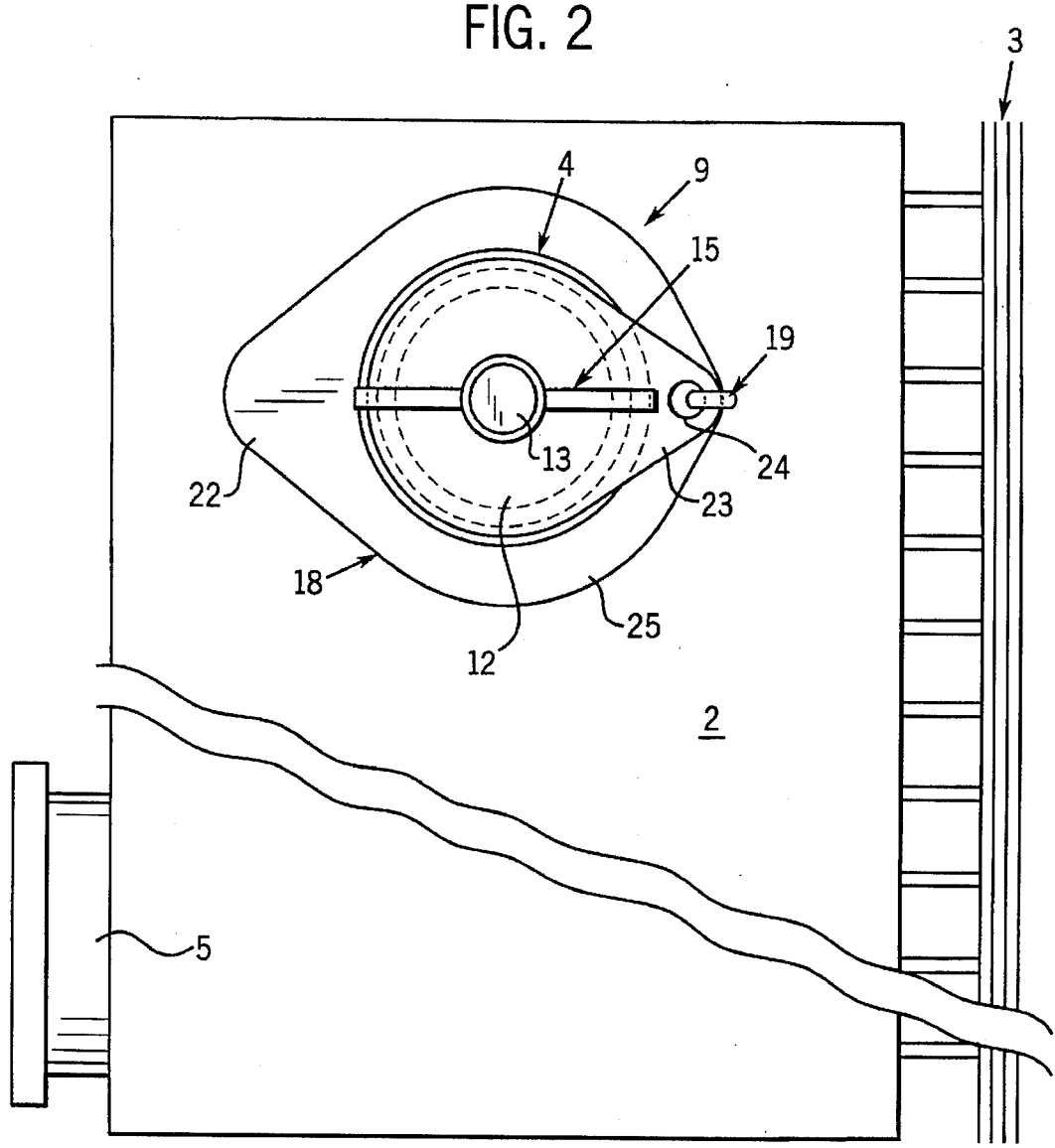
FIG. 2 is a plan view of the structure shown in FIG. 1.
Figure 3:
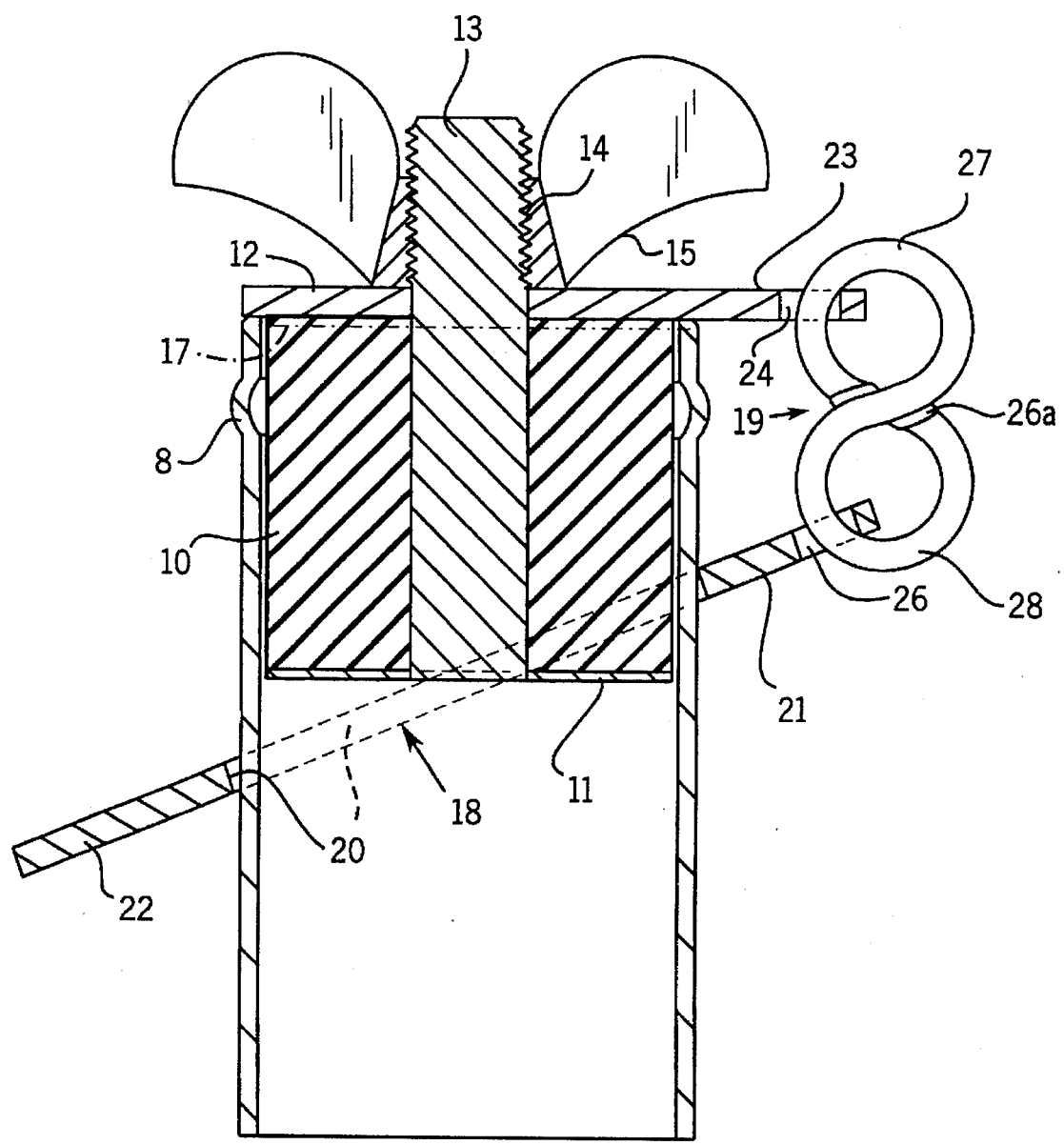
FIG. 3 is an enlarged vertical section taken generally on line 3—3 of FIG. 2 and more clearly illustrating the interaction of the assembly.
Figure 4:
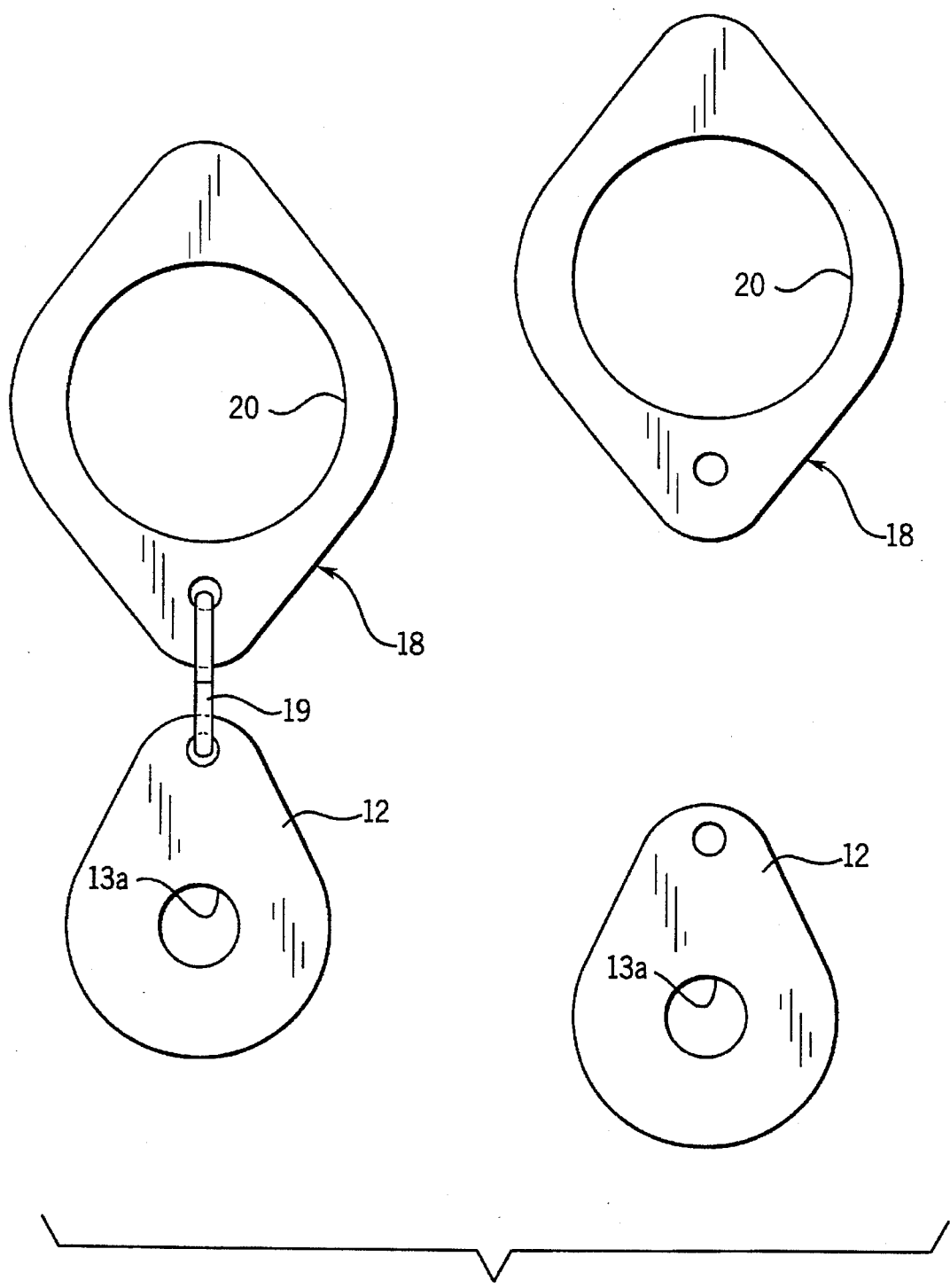
FIG. 4 is a pictorial view of the safety retainer unit.

Referring to the drawings, and particularly to FIGS. 1 and 2, an embodiment of the invention is illustrated applied to a diagrammatically illustrated radiator 1. The radiator i includes a radiator tank 2, which may be typical of any pressure vessel, which is adapted to be periodically tested for its pressure condition. The illustrated unit includes a radiator structure 3 with water or other fluid to be circulated therethrough.

The typical radiator tank 2 includes an inlet pipe 4 and a filler neck 5 for circulation of a cooling solution, not shown, through the radiator structure 3, or any other temperature exchange mechanism. Thus, the present invention is applicable to any vessel which is to be pressurized and has a tubular connector or can be provided therewith and in which the connector extends from the vessel or system to be checked and terminates in an outer sealable end. In the illustrated embodiment, a test unit 6 is applied to the illustrated pipe 4, shown as a circular pipe member having a flat outer end 7. Spaced slightly inwardly from the flat outer end is an integral raised bead 8 which may be provided to receive a closure cap not shown. The tubular pipe 4 is shown sealed by the test plug unit 6 incorporating a safety retainer unit 9 constructed in accordance with and illustrating an embodiment of the present invention.

Test plug unit 6 is illustrated as a well-known releasable sealing unit. The test plug unit 6 is thus shown incorporating an expandable rubber ring 10 secured between spaced end plates 11 and 12. A clamping bolt 13 is secured to the inner plate 11 and projects outwardly of the tubular pipe 4. The clamping bolt 13 has its inner end connected to the inner clamping plate 11 directly or through a bolt head, not shown, or the like. The outer end of the bolt 13 is threaded as at 14 and projects through an opening 13a in plate 12 and outwardly of the outer clamping plate 12. A wing nut 15 is shown threaded onto the upper end of the bolt 13 after assembly of the rubber ring 10 within the pipe 4 for collapsing of the rubber ring into sealing engagement therewith. The wing nut 15 bears on plate 12 which forms a stop against the outward movement of the expandable rubber ring 10 on bolt 13 during the threading of the nut 15 onto the bolt 13. Tightening of nut 15 thus draws inner plate 11 and bolt 13 through the rubber ring 10 causing the ring 10 to expand; with the outer periphery moving into sealing engagement with the inner wall of the pipe 4.

The safety retainer unit 9 functions to positively lock the test plug unit 6 to the pipe 4 in the event of a pressure condition which is sufficiently great to drive the test plug unit 6 from within the pipe 4. Thus, if the pressure force increase above the holding force established by the expanded ring 10 or a failure of the expanded ring, the test plug unit 6 could be blown outwardly of the pipe connector, and if not restrained, constitute a dangerous flying projectile.

The safety retainer unit 9 includes plate 12, which also functions as a clamping plate of the plug unit, and a locking plate 18 interconnected to each other by a coupler 19. If an existing plug structure is used having an outer clamp plate as shown in phantom at 17, the plate 12 abuts such existing plate structure, with the unit otherwise functioning in the same manner.

Plate 12 is shown as a round plate having a central opening 17a telescoped over the bolt 13 beneath the nut 15 and abutting the end 6 of pipe 4. The opening 17a has a diameter significantly less than the hub portion of the wing nut 15, and the wing nut 15 threaded onto the bolt 13 locks plate 12 in abutment to the connector 4. The locking plate 18 is shown as a flat metal plate member having a opening 20 of a diameter slightly larger than that of the connector pipe 4 including the raised bead 8. The plate 18 can thus be located on the connector pipe 4 at an inclined angle with the coupled outer end 21 spaced adjacent to the clamping plate 12, and the inner end 22 located inwardly on the connector pipe 4. Application of a axial or outward force on the outer end 21 pivots the plate 18 onto the connector pipe 4 tending to lock it to the connector and preventing axial outward movement on pipe 4.

The coupler 19 provides a firm interconnection between the plate 12 and thus test plug unit 6 and the locking plate 18 of safety retainer assembly or unit 9. Thus, if the test plug unit 6 fails and pressure tends to force the unit 6 from the connector pipe 4, it will create a force tending to carry the plate 12 and coupled angled locking plate 18 outwardly with the force applied to the outer end 21. The force applied by projecting of test plug unit 6 thus further locks the locking plate 18 to the connector pipe 4, and maintains the total assembly safely onto the vessel, and preventing it from being propelled outwardly freely into space.

More particularly, in the illustrated embodiment of the invention, the plate 12 has a diameter generally corresponding to, or slightly larger than the connector pipe 4. It includes an outwardly projecting extension or ear 23 spaced outwardly of the periphery of pipe 4. The ear 23 has an outer coupling opening 24 receiving the interconnecting coupler.

The locking plate 18 is a generally similarly formed plate of a larger outer diameter than the plate 12, and having the inner opening 20 larger than the outer diameter of the pipe connector. In practical application, the opening 20 was ¼ inch larger than the pipe 4. The outer end of the locking plate 18 has an extension or ear 25 aligned with the ear 23 of the clamping plate 12. Ear 25 also has an opening 26 aligned with the opening 24 in the clamping plate 12, with the coupler 19 connected to the plates at the opening.

The coupler 19 is generally an 8-shaped ring type connector. The coupler 19 is shown as a single, integral wire member bent into the 8-shaped configuration with the opposite end loops. The ends of the wire member terminate immediately adjacent the center of the two loops and are preferably secured to the center, as by a brazed joint 26a. The brazed joints add rigidity to the assembly. The upper or outer loop 27 is passed through the opening 24 in the clamping plate 12. The lower or inner loop 28 is passed through the opening 26 in the locking plate 18. Thus, in the assembled relation, the coupler 19 generally holds the locking plate 18 with the outer end 21 spaced downwardly in relationship to the outer end of the connector pipe 4 by a relatively short distance. The locking plate 18 projects at an angle downwardly across the pipe 4 with the inner end 22 located to the opposite side of the connector pipe 4. In assembly, the operator should preferably positively move the plate 18 into an angled position to establish an initial locking position engaging the connector pipe. Generally, as applied to radiators, inlet pipe 4 is a load connecting pipe for flow of the liquid from the radiator to the load, such as an internal combustion engine. The inlet pipe 4 is almost universally a vertically oriented pipe and gravity will force the locking plate to assume the angled orientation on the pipe. If not vertically oriented, the installing personnel should insure the angled orientation, and coupler 19 should be constructed to maintain such orientation with frictional engagement between the plate 18 and the pipe or other tubular member. Similarly, if a longer coupling is required for any reason, with the locking plate spaced substantially from the pipe end, the coupling chain preferably includes frictional forces to hold the locking member in place.

The 8-shaped coupler is formed of a sufficiently strong metal to maintain the connection between the plates 12 and 18 for any force which will tend to project the test plug unit 6 from the connector 4 and transmit the force to the locking plate 18 for retaining the plug unit 6 and the safety retainer unit 9 to the connector pipe 4. In the illustrated embodiment, the rigid coupler 19 is sufficiently short to prevent the illustrated seal unit 6 from being blown substantially outwardly of the pipe 4, and maintain maximum safety. The structure is preferably constructed and arranged with sufficient structural strength however to insure the seal unit is fixed to the pipe or other tubular member if the seal unit can in fact leave the tubular member wholly or substantially under test conditions.

The illustrated embodiment of the safety retainer assembly provides a highly effective, low cost unit for use in conventional radiator safety testing. The raised bead would, of course, tend to provide a secondary stop in the event the locking plate should tend to slide on the connector either because of failure to positively establish an initial locking position or the like. However, it is not essential, and as long as the locking plate is inserted at an angular orientation for some distance from the end of the pipe, any force applied to the outer end by the removing plug will result in the significant and safety locking of the assembly to the connector.

In the illustrated embodiment, plus unit is a known construction with separate plates 11 and 12 provided to the end faces of expandable ring 10. In the illustrated embodiment, plate 12 may form a common part of the test plug unit 6 and a part of the safety retainer assembly or unit 9. Thus, the outer clamp plate 11 may be replaced by the plate 12. Further, any other positive interconnect between the plug unit and the locking plate may be provided. Thus, a coupler might be provided with a suitable connection coupler to the wing nut as the locking plate. Although the expansion unit is shown as conventional rubber ring member, other sealing mechanisms may be provided to seal the opening and coupled to the locking member.

These and other high strength physical connections between a seal unit and the special locking member will be readily provided by those skilled in the art within the broadest teaching of the present invention, which is particularly directed to the very simple locking member structure to positively interconnect to the test plug or other seal unit, with an increasing locking force responsive to any forced high pressure removal of the seal unit from the connector.

Various modes of carrying out the invention are contemplated as being within the scope of the following claims particularly pointing out and distinctly claiming the subject matter which is regarded as the invention.

I claim:

1. A high pressure vessel sealing apparatus for releasable attachment to an elongated tubular connector of a high pressure vessel, said elongated tubular connector having an axis and an axial end opening with an internal sealing surface, comprising in combination:

a seal unit including an expandable sealing member for insertion into said axial end opening within said tubular connector and having an assembly coupled to said expandable sealing member for expanding of said expandable sealing member into sealing engagement with the internal surface of the axial end opening of the tubular connector;

a safety retainer unit including a locking member having a locking opening substantially larger than the tubular connector for angular positioning with respect to the horizontal of said locking member on said tubular connector, said locking opening having diametrically opposite first and second portions for substantial spacement axially of said connector and for engagement with opposite axially spaced areas of said tubular connector; and a high strength coupling unit connected to said first portion of said locking member and to the seal unit and establishing the angular positioning of said locking member on said tubular connector and outward force on said first portion pivots the locking member to further lock the locking member to said tubular connector, said coupling unit maintaining said locking connection of said locking member to said seal unit without substantial movement of the locking member on and from said tubular connector upon failure of the seal unit and a substantial propelling force on the seal unit from within the tubular connector.

2. A safety retainer unit for securing a seal unit within the outer end of an elongated tubular connector having an axis, said seal unit sealing said outer end of the tubular connector, said tubular connector being subjected to an internal pressure which can propel a failed seal unit from the connector with damaging force comprising:

a locking plate having an opening substantially larger than the connector for freely moving over said tubular connector, said opening being sufficiently large for angularly orienting said locking plate on said tubular connector with a first edge portion of the opening and a second edge portion of the opening diametrically opposed said first edge and substantially spaced axially from each other on said connector and with the first edge portion adjacent the outer end of the elongated tubular connector, whereby an axial force on said first edge portion pivots said locking plate on said tubular connector and prevents axial outward movement of said plate on and from said tubular connector; and an interconnecting coupler having a first member connected to said locking plate at said first edge portion and having a second member for fixed connection to said seal unit to support said locking plate in place against substantial forces and whereby outward movement of said seal unit from said tubular connector creates an axial force on said first edge portion and pivots said locking plate and increases the locking engagement of said plate to said tubular connector to thereby restrain and limit outward movement of said seal unit in the presence of said internal pressure.

3. An apparatus for sealing a tubular connector of a high pressure vessel, said high pressure vessel being subjected to abnormal high test pressure in excess of rated pressure and operable to propel a closure in said connection therefrom, said tubular connector having an end opening with an internal surface, comprising in combination:

a test plug unit including an expandable resilient sealing member for inserting into said end opening of said tubular connector;

a compression plate assembly coupled to said expandable resilient sealing member and including a stem member and a compressing member on said stem member for selectively expanding said sealing member into sealing engagement with the internal surface of the tubular connector;

a safety retainer unit including a locking member having an opening substantially larger than the tubular connector for angular orientation with respect to the horizontal of said locking member on said tubular connector with a first edge portion abutting said connector and a second edge portion abutting the tubular connector in diametrically spaced relation to said first edge portion;

a high strength coupling unit connected to the locking member and to the test plug unit, said coupling unit maintaining said connection without movement of the locking member on and from said connector upon failure of and outward movement of the test plug unit in response to the abnormal high test pressure within the tubular connector applying a propelling force on the plug unit, said coupling unit holding said locking member in said angular orientation on said tubular connector, and outward axial force on said locking member at said first edge portion further locking the locking member to said tubular connector as a result of forced interengagement between said connector and said first and second edge portions of the locking opening.

4. The apparatus of claim 3 wherein said locking member is a circular plate with a central opening and with a first plate extension adjacent said second edge portion and a second plate extension adjacent the first edge portion, said coupling being connected to said second plate extension.

5. The apparatus of claim 4 wherein said coupling unit includes a connecting plate having an opening, said compression plate assembly including a bolt projecting from the tubular connector and having an outer clamping nut, said connecting plate abutting the tubular connector beneath said clamping nut and with the bolt passing through the opening of said connecting plate and secured to said connector by said clamping nut.

6. The apparatus of claim 5 wherein said coupling includes a high strength looped member including a first loop connected to said second plate extension on the outer end of said locking plate and a second loop connected to said connecting plate to support said locking plate in place and permit relative pivotal movement of the plates and with continued movement of said test unit from said tubular connector locking of said plates to each other and to said tubular connector.

7. The method of locking a releasable seal unit to an elongated tubular outlet connector of a pressure vessel, said elongated tubular outlet connector having an outer end opening receiving said seal unit, comprising assembling a locking member having an opening substantially larger than the diameter of the tubular connector over the tubular connector, locating said locking member in axial angular orientation on said tubular connector with a first edge portion of the opening engaging the outer end of said tubular connector and a second edge portion engaging a substantially inwardly axially spaced portion of the tubular connector, and fixedly securing a connecting member to said locking member adjacent said first edge portion and to said seal unit with the seal unit in a sealing position, said connecting member supporting said locking member in said angular orientation, said connecting member establishing an axial force on said first edge portion upon forced expulsion of the seal unit under a selected pressure in said tubular connector, expulsion of said seal unit establishing an axial force on said locking member and pivoting said locking member into forced engagement with said tubular connector and thereby limiting outward movement of said locking plate and said attached seal unit to prevent separation of the seal unit from said tubular connector.

8. The method of claim 7 wherein said seal unit includes an outer nut and bolt member for expanding the seal unit, and including assembling a connecting plate abutting the outer end of said tubular connector and said seal unit, said securing step including securing said connecting members to said connecting plate, and tightening said clamping nut onto said bolt member and said connecting plate to firmly couple the connecting member to the seal unit.

9. The vessel sealing apparatus of claim 1 wherein said seal unit and said coupling unit are constructed and arranged to prevent the seal unit from substantially leaving said tubular connector as a result of said propelling force.

* * * * *